US00RE39182E

(19) United States
(12) Reissued Patent
Mück et al.

(10) Patent Number: US RE39,182 E
(45) Date of Reissued Patent: Jul. 11, 2006

(54) PROCESS FOR THE PREPARATION OF THERMALLY STABLE POLYOXYMETHYLENE COPOLYMERS

(75) Inventors: Karl-Friedrich Mück, Wiesbaden (DE); Horst Röschert, Ober-Hilbersheim (DE); Robert M. Gronner, Corpus Christi, TX (US); Satyajit Verma, Corpus Christi, TX (US); Michael G. Yearwood, Bishop Nueces, TX (US)

(73) Assignee: Ticona GmbH (DE)

(21) Appl. No.: 09/998,276

(22) Filed: Nov. 30, 2001

Related U.S. Patent Documents

Reissue of:
(64) Patent No.: 5,994,455
Issued: Nov. 30, 1999
Appl. No.: 09/149,795
Filed: Sep. 8, 1998

(51) Int. Cl.
*C08K 5/41* (2006.01)
*C08G 4/00* (2006.01)

(52) U.S. Cl. ..... 524/745; 528/232; 528/241; 528/242; 528/244; 528/248; 528/249; 528/250; 524/701; 524/706; 524/713; 524/730; 524/792

(58) Field of Classification Search ..... 528/232, 528/241, 242, 244, 248, 249, 250; 524/701, 524/706, 713, 730, 745
See application file for complete search history.

(56) References Cited

U.S. PATENT DOCUMENTS 4,431,794 A * 2/1984 Sadlowski et al. ..... 528/232
5,144,005 A * 9/1992 Sextro et al. ..... 528/480

FOREIGN PATENT DOCUMENTS

| | | | |
|---|---|---|---|
| DE | 3147757 | * | 7/1982 |
| DE | 31 47 757 A | | 7/1982 |
| DE | 3147757 A1 | | 7/1982 |
| EP | 0080656 | | 6/1982 |
| EP | 0 080 656 | | 6/1983 |
| EP | 0347119 | | 12/1989 |
| EP | 0 347 119 | | 12/1989 |
| JP | 6-92475 | * | 8/1992 |

* cited by examiner

*Primary Examiner*—Samuel A. Acquah
(74) *Attorney, Agent, or Firm*—Connolly Bove Lodge & Hutz LLP

(57) ABSTRACT

A process for the preparation of polyoxymethylene copolymers, wherein 1,3,5-trioxane is polymerized with generally known comonomers in the presence of a strong protonic acid initiator and in the presence of a formaldehyde dialkyl acetal, and wherein the initiator is dissolved in the formaldehyde dialkyl acetal before admixing to the trioxane and the comonomers.

8 Claims, No Drawings

PROCESS FOR THE PREPARATION OF THERMALLY STABLE POLYOXYMETHYLENE COPOLYMERS

Matter enclosed in heavy brackets [ ] appears in the original patent but forms no part of this reissue specification; matter printed in italics indicates the additions made by reissue.

Process for the preparation of thermally stable polyoxymethylene copolymers

The present invention relates to a process for the preparation of thermally stable polyoxymethylene (POM) copolymers wherein the initiator is distributed within the monomers through prior dissolution in a formaldehyde dialkylacetal.

Thermoplastic molding materials of POM homopolymers and copolymers have long been frequently used as versatile materials of construction, particularly in engineering and manufacturing. In many cases they can be used as a substitute for metals on account of their outstanding mechanical properties, such as high rigidity, hardness and strength and the fact that it is possible to produce moldings and molded parts to strict tolerance limits, and their good resistance to many chemicals.

It is known that, by copolymerizing trioxane with cyclic ethers or cyclic acetals, copolymers can be obtained in which the sequence of the —$CH_2$—O— groups is interrupted by randomly distributed comonomer units such as —$CH_2CH_2$—O—, —$(CH_2)_4$—O— or —$CH_2$—$CH_2$—O—$CH_2$—$CH_2$—O— (G. W. Becker/D. Braun, Kunststoff-Handbuch, Vol. 3/1, p. 303, Munich-Vienna, 1992). The comonomers are normally used in a weight proportion of 0.2 to 20%. Suitable initiators used in the present invention are strong protonic acids selected from the group consisting of trifluoromethanesulfonic acid and anhydrides, pentafluoroethylsulfonic acid and anhydrides, heptafluoropropylsulfonic acid and anhydrides, nonafluorobutyl sulfonic acid and anhydrides, perfluoroheptylsulfonic acid and anhydrides, and mixtures thereof Suitable initiators are also Lewis acids selected from the group consisting of phosphorus pentafluoride, silicon tetrafluoride, boron trifluoride, boron trifluoride etherates, tintetrachloride, arsenic pentafluoride, triphenylmethyl hexafluorophosphate, and mixtures thereof At the end of the polymerization reaction the crude POM polymer still contains a certain amount of unconverted monomers and unstable terminals which have to be eliminated to stabilize the final product.

In order to be able to form such a polymer from the melt, as it is customary for thermoplastics, it is necessary to deactivate the polymerization initiator, to remove the adhering monomer residues from the polymer and to break down the unstable fractions.

Thus, it is known that the deactivation of the initiator is carried out in the aqueous phase or in an organic solvent, subsequent filtration, washing and drying steps being required. The deactivation of the initiator with the addition of different deactivators can also be effected in the melt (DE 3703790). The deactivation step is often carried out in combination with the demonomerization and the elimination of unstable chain ends (DE 37 38 632 and EP 0 137 305). EP 0673 955 describes a process in which crude polymer is treated with a steam which also contains small amounts of volatile base. In this way, unconverted residual monomer is removed and the initiator is deactivated. JP 05059255 states that the initiator is deactivated by adding alkali metal or alkaline earth metal oxides to the polymer melt.

The elimination of unstable terminal groups, which usually remain in the crude polymer after the polymerization and in particular lead to chain degradation when the polymer is heated, is also a usual process step in the preparation of POM copolymers. The unstable hemiacetal end groups in trioxane copolymers can be selectively broken down, for example, by hydrolysis, i.e. by treating the copolymer at temperatures of from 120 to 220° C. with pressurized water comprising alkaline material, especially trialkylamines, and optionally with the addition of organic solvents, especially lower alcohols, trioxane or dioxolane (Kunststoff Handbuch, p. 316). After the hydrolysis, the polymer must be precipitated again, washed and dried.

The object of the invention therefore is to develop a process which makes it possible economically to prepare stable copolymers of 1,3,5-trioxane in a continuous process while avoiding the deficiencies of the known processes.

It has now been found that thermally stable POM polymers can be obtained if the initiator, which in general is a strong protonic acid, is first dissolved in a formaldehyde dialkylacetal, a substance which usually is known to regulate the molecular weight of the POM polymer, and then added to the reaction mixture. The invention eliminates the need to utilize an organic solvent carrier, an unnecessary component in the reaction mechanism, for the introduction of the protonic or Lewis acid into the reaction mixture.

The present invention accordingly relates to a process for preparing polyoxymethylene copolymers, wherein 1,3,5-trioxane is polymerized with generally known comonomers in the presence of a strong protonic acid initiator and in the presence of a formaldehyde dialkyl acetal, and wherein the initiator is dissolved in a portion of the formaldehyde dialkyl acetal before admixing the same with trioxane and the comonomers.

In the prior art process of the production of POM polymers, generally formaldehyde dialkyl acetals are used as molecular weight regulators. Generally, the use of use a molecular weight regulator has not been known to produce high molecular weight polymers.

The advantage of the process according to the invention is, however, that through initial dissolution of the initiator in a formaldehyde dialkylacetal it is possible to add a very low quantity and controlled amount of the initiator in a perfectly dispersed state to the monomer mixture thereby controlling the reaction rate. Due to the very low quantity of initiator in the reaction mixture it is possible to also produce high molecular weight material although there is a small amount of molecular weight regulator present in the reaction mixture. According to the invention, it is possible to avoid contamination of the monomers and resulting polymer with substances which are critical to the polymerization process. For example, it is no longer necessary to add an agent to deactivate the initiator. In principle, it is also no longer necessary to perform hydrolysis to the crude polymer. However, to further reduce the content of unstable terminal groups in the polymer, it is advantageous to perform hydrolysis thereto.

In the process according to the invention, the initiator can be dissolved in a part of or in the total amount of formaldehyde dialkyl acetal used. The formaldehyde dialkyl acetal comprising the dissolved initiator usually is added to the mixture of trioxane and comonomers, i.e. the reaction mixture. A further predetermined amount of formaldehyde dialkyl acetal can be directly added to the reaction mixture before or after admixing the formaldehyde dialkyl acetal and dissolved initiator solution therewith.

In another working example, the formaldehyde dialkyl acetal containing the dissolved initiator is premixed with the comonomers before admixing the same with the trioxane. Optionally, a further predetermined amount of formaldehyde dialkyl acetal may be added to the reaction mixture afterwards.

In the process according to the invention strong protonic acids, in particular heteropoly acids, perchloric acid and perfluoroalkanesulfonic acids, can be used as initiator. Trifluoromethanesulfonic acid is the preferred initiator. The amount of the initiator generally is at least about 0.01 to about 1.0 ppm, based on the total amount of trioxane and comonomers. Preferably the amount of the initiator is from about 0.03 to about 0.4 ppm, and preferably from about 0.05 to about 0.2 ppm, based on the total amount of trioxane and comonomers.

Suitable formaldehyde dialkyl acetals used according to the invention are formaldehyde dimethyl acetal, formaldehyde diethyl acetal, formaldehyde dipropyl acetal, and formaldehyde dibutyl acetal. Formaldehyde dimethyl acetal, i.e. methylal, is preferred. The amount of formaldehyde dialkyl acetal, generally, is from about 3.4 to about 34 mmol per total kg of trioxane and comonomers.

Suitable comonomers of the present invention are generally known and may be selected from the group consisting of ethylene oxide, 1,3-dioxolane, 1,3-trioxepane, diethylene glycol formal, 1,4-butanediol formal, 1,3-dioxane, propylene oxide, trimethylene oxide, butadiene oxide, o-xylene glycol formal, thiodiglycol formal, 1,3-oxthiolane, and mixtures thereof. Particularly preferable comonomers are ethylene oxide, 1,3-dioxolane, diethylene glycol formal, and 1,4-butanediol formal. The amount of the comonomer utilized herein may range from about 0.2 to about 10% by weight, preferably from about 0.4 to about 5% by weight, based on the total amount of trioxane and comonomers.

The polymerization process according to the invention can be performed in any polymerization reactor or combination of reactors known for the production of POM polymers.

Further, antioxidants, acid acceptors, lubricants, waxes, UV stabilizers, nitrogen-containing co-stabilizers and other products known in the art for POM may be used as stabilizers and additives, either individually or in combination.

All fillers and reinforcing materials customary and known for plastics, in particular polyacetal copolymers, may be used as fillers and reinforcing materials.

EXAMPLES

Example 1

In a batch reactor operated at a temperature of about 80° C. and a pressure of about 1 atms., 96.6% by weight of trioxane was mixed with 3.4% by weight of dioxolane to form a monomer mixture. To this mixture 0.2 ppm of trifluoromethanesulfonic acid (TFMSA) dissolved in 500 ppm of formaldehyde dimethyl acetal (Methylal) were added, the quantities in ppm being based on the total weight of the monomer mixture. After an induction period of about 30 seconds the polymerization started. The obtained crude polymer was quenched in a water/triethylamine mixture and subsequently hydrolyzed at 170° C. in a water/methanol (10/90) mixture from which it was precipitated at room temperature. From the dried product the melt viscosity ratio (MVR) value and, through the measurement of the formaldehyde formation during 1 hour at 170° C. under alkaline conditions, the content of unstable terminal groups was determined (for data, cf. Table 1).

Examples 2 and 3

The procedure in Example 1 was utilized herein and additional amounts of methylal were added to the monomer mixture. The MVR and percent of unstablized terminal groups are shown (for data, cf. Table 1).

Comparative Examples 4 through 6

Utilizing the procedure of Example 1, 96.6% by weight of trioxane was mixed with 3.4% by weight of dioxolane to form the monomer mixture. To this mixture 50 ppm of $BF_3$ gas and 0 ppm, 400 ppm or 1000 ppm of formaldehyde dimethyl acetal (Methylal) were added, respectively, to the monomer mixture of Examples 4,5 and 6, the quantities in ppm being based on the total weight of the monomer mixture and being adjusted to obtain products having the same MVR values as in Examples 1–3, respectively. After an induction period of 30 seconds the polymerization started. The obtained crude polymer was quenched in a water/triethylamine mixture and subsequently hydrolyzed at 170° C. in a water/methanol (10/90) mixture from which it was precipitated at room temperature. The dried product was analyzed as in Examples 1–3.

TABLE 1

| Example | Thoxane % b.w. | Dioxolane % b.w. | $BF_3$ ppm | TFMSA in Methylal ppm/ppm | Additional Methylal ppm | Total Methylal ppm | MVR m/10 cm | Unstable terminals % |
|---|---|---|---|---|---|---|---|---|
| 1 | 96.6 | 3.4 | | 0.2/500 | 0 | 500 | 2.5 | 0.04 |
| 2 | 96.6 | 3.4 | | 0.2/500 | 500 | 1000 | 9 | 0.035 |
| 3 | 96.6 | 3.4 | | 0.2/500 | 1000 | 1500 | 27 | 0.03 |
| 4 | 96.6 | 3.4 | 50 | | 0 | 0 | 2.5 | 0.25 |

TABLE 1-continued

| Example | Thoxane % b.w. | Dioxolane % b.w. | $BF_3$ ppm | TFMSA in Methylal ppm/ppm | Additional Methylal ppm | Total Methylal ppm | MVR m/10 cm | Unstable terminals % |
|---|---|---|---|---|---|---|---|---|
| 5 | 96.6 | 3.4 | 50 | | 400 | 400 | 9 | 0.20 |
| 6 | 96.6 | 3.4 | 50 | | 1000 | 1000 | 27 | 0.18 |

In accordance with the data shown in Table 1, after the MVR values were adjusted in Examples 3, 4, and 5 to be equal to those of Examples 1, 2 and 3, the percentage of unstable terminal end groups of the polymers were dramatically reduced (see Examples 1, 2 and 3) wherein small amounts of trifluoromethanesulfonic acid dissolved in methylal were added to the reaction mixture.

We claim:

1. A process for the preparation of polyoxymethylene copolymers exhibiting a reduced amount of unstable terminal end groups comprising, polymerizing 1,3,5-trioxane with at least one cyclic ether [and] *or* acetal comonomer with the aid of a strong protonic acid or Lewis acid initiator and in the presence of a formaldehyde dialkyl acetal, the improvement comprising dissolving the initiator in the formaldehyde dialkyl acetal before introducing the same to the trioxane and the comonomers.

2. The process according to claim 1, wherein the strong protonic acid initiator is selected from the group consisting of trifluoromethanesulfonic acid and anhydrides, pentafluoroethylsulfonic aicd and anhydrides, heptafluoropropylsulfonic acid and anhydrides, nonafluorobutyl sulfonic acid and anhydrides, and perfluoroheptylsulfonic acid, anhydrides, and mixutres thereof and the Lewis acid is selected from the group consisting of phosphorus pentafluoride, silicon tetrafluoride, boron trifluoride, boron trifluoride eatherates, tintetrachloride, arsenic pentafluoride, triphenylmethyl hexafluorophosphate, and mixtures thereof.

3. The process according to claim 2, wherein the strong protonic acid initiator is trifluoromethanesulfonic acid and the Lewis acid is boron trifluoride.

4. The process according to claim 3, wherein the strong protonic acid or Lewis acid initiator is present in an amount of from about 0.01 to about 1 ppm, based on the total amount of trioxane and comonomers.

5. The process according to claim 4, wherein the formaldehyde dialkyl acetal is selected from the group consisting of formaldehyde dimethyl acetal, formaldehyde diethyl acetal, formaldehyde dipropyl acetal, formaldehyde dibutyl acetal, and mixtures thereof.

6. The process according to claim 5, wherein the formaldehyde dialkyl acetal is formaldehyde dimethyl acetal.

7. The process according to claim 6, wherein the formaldehyde dialkyl acetal is present in an amount of from about 3.4 to about 34 mmol per kg of trioxane and comonomers.

8. The process according to claim 2, wherein the formaldehyde dialkyl acetal containing the dissolved strong protonic acid initiator is added to the comonomers before admixing to the trioxane.

* * * * *